Oct. 1, 1968  C. A. BURGESS  3,404,200
METHOD OF PREPARING A CERMET NUCLEAR FUEL
Filed Aug. 8, 1967  2 Sheets-Sheet 1
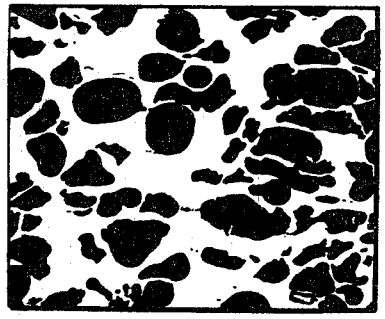
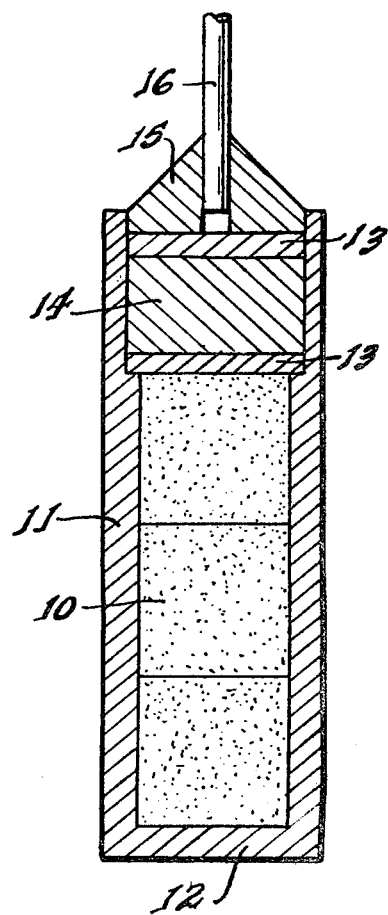
Inventor
Carl A. Burgess
Attorney Oct. 1, 1968  C. A. BURGESS  3,404,200
METHOD OF PREPARING A CERMET NUCLEAR FUEL
Filed Aug. 8, 1967  2 Sheets-Sheet 2

Inventor
Carl A. Burgess
Attorney

United States Patent Office 3,404,200
Patented Oct. 1, 1968

3,404,200
METHOD OF PREPARING A CERMET
NUCLEAR FUEL
Carl A. Burgess, Kennewick, Wash., assignor to the United
States of America as represented by the United States
Atomic Energy Commission
Filed Aug. 8, 1967, Ser. No. 659,572
5 Claims. (Cl. 264—.5)

ABSTRACT OF THE DISCLOSURE

A method of preparing a cermet nuclear fuel comprising preparing rounded particles of stoichiometric plutonium dioxide or uranium dioxide or mixtures thereof having a density substantially less than theoretical, mixing these particles with metal particles, compressing the mixture into pellets, loading the pellets into a heavy can, and coextruding the can and contents.

CONTRACTURAL ORIGIN OF THE INVENTION

The invention described herein was made in the course of, or under, a contract with the United States Atomic Energy Commisison.

BACKGROUND OF THE INVENTION

This invention relates to a method of preparing a cermet nuclear fuel. The invention also relates to a method of preparing a high-density cermet fuel containing a low-density fissionable oxide and to the fuel material so prepared.

Cermet fuel materials, consisting of a fissionable ceramic material distributed in a metallic matrix, are particularly useful as fuel for a high-temperature, high-burnup fast reactor such as the proposed Fast Flux Test Facility. It appears that the only materials which could be used as fuel for such a reactor without an extensive development effort in addition to cermets would be the fissionable oxides. It appears, however, that the oxides suffer from one great disadvantage which does not necessarily apply to the cermets.

At the burnup and temperature required for a reactor such as the Fast Flux Test Facility it is clear that porosity must be introduced into the oxide phase to accommodate swelling due to burnup and thermal expansion. It is, of course, also desirable that the matrix be formed of high-density material for over-all fuel element strength. While it is simple to introduce porosity into an oxide fuel by providing an annular gap around pellet fuel, by employing annular pellets, or by employing low-density or porous pellets, it is not so simple to keep the porosity where it is wanted. For example, fuel relocation due to thermal gradients—possibly following melting of the fuel—might result in a more dense oxide in one location than another and behavior of the fuel during a reactivity transient might make the reactor unsafe.

On the other hand, in a cermet containing a porous oxide the void volume is where it is wanted—in the oxide particles—and this is where the void volume stays at all times. Thus it is not necessary to rely on the cladding to be strong enough to take up the strain due to swelling of the fuel.

Unfortunately, usual methods for the preparation of cermets do not result in a low-density ceramic phase distributed in a high-density metallic phase. A method which has been used in the past includes cold pressing (using either pellet presses or hydrostatic presses) followed by sintering of ceramic and metal powders, and coextrusion. These steps have in common the inability to control the characteristics of the ceramic phase independently of the metallic phase.

It is, of course, apparent that for other uses the ceramic phase could be of high density. It will become apparent hereinafter that by employing this invention the physical characteristics of the ceramic phase and metallic phase can be separately controlled to produce a cermet fuel material having the desired characteristics for a proposed use.

It is accordingly an object of the present invention to develop a method of preparing a cermet fuel element including a ceramic phase of controlled density.

It is also an object of the present invention to develop a method of preparing a fuel element for a nucletar reactor incorporating a low-density ceramic phase distributed in a high-density metal phase.

It is another object of the present invention to prepare a cermet fuel element characterized by a high-density metallic phase and a comparatively low-density ceramic fuel phase.

SUMMARY OF THE INVENTION

These and other objects of the present invention are attained by preparing stoichiometric oxide fuel particles of relatively low density and with rounded corners, mixing these fuel particles with a metal powder, cold pressing the mixture into pellets, and compressing the pelletized fuel to the desired density.

BRIEF DESCRIPTION OF THE FIGURES

FIG. 1 is a diagrammatic view of a cermet extrusion billet utilized in the process of this invention.

FIG. 2 is a tracing of a photomicrograph of a section taken through a cermet containing $Pu_2O_3$ in a high-density stainless steel matrix after hot working at 1200° C. Enlargement is 50×.

FIG. 3 is a similar tracing wherein the oxide constituent of the cermet is $PuO_{2-x}$.

FIG. 4 is a similar tracing wherein the oxide constituent of the cermet is $PuO_{2.00}$.

DESCRIPTION OF THE PREFERRED EMBODIMENT

Figure 5:
FIG. 5 is a tracing of a photomicrograph of a section through a cermet containing $PuO_{2.00}$ particles in a high-density stainless steel matrix after extrusion wherein the particles have not had their corners rounded off.

A complete description of the method of the present invention as applied to the preparation of a cermet nuclear fuel consisting of plutonium dioxide particles distributed in a stainless steel matrix will next be given.

(1) Purified plutonium in the form of a metallic strip is converted to the oxide by burning in a water-saturated atmosphere at a temperature controlled to within 450 and 500° C. which produces plutonium dioxide with an average particle size less than 325 mesh (44 microns). This treatment produces plutonium dioxide which in subsequent treatments forms low-density particles (<90% of the theoretical density) in the final product. If the plutonium is burned at a high temperature—about 1000° C.—plutonium dioxide with a larger particle size is formed and the final product includes high-density particles (>99% of the theoretical density).

(2) The plutonium dioxide is then calcined at 1000° C. for at least one hour to dry the oxide and assure that the oxygen-to-metal atom ratio is 2.00.

(3) The stoichiometric plutonium dioxide is then consolidated by pneumatic impaction and subsequent sizing. Pneumatic impaction is carried out by loading the plutonium dioxide into a small stainless steel can, loading this can into a larger can, and filling the space between the cans with $Al_2O_3$. The smaller can is thus "floated" within the larger can on a cushion which transmits the impaction forces isostatically. The assembled billet is then vacuum outgassed and subjected to pneumatic impaction using a Model 1220B Dynapak machine, with a fire pressure of 1000–1100 p.s.i. Under these conditions, the resulting plutonium dioxide particle density is about 70% of theoretical. Various conditions can be reproducibly employed to control the particle density within the range of 60–95% of theoretical. An agglomeration technique or the "Sol-Gel" process could be used rather than pneumatic impaction.

(4) The densified plutonium dioxide is then crushed and screened to produce particles having a size distribution of less than 35 mesh and greater than 80 mesh (480 to 170 microns).

(5) The plutonium dioxide particles are next "jet milled" to adjust the size distribution to −65 +100 mesh (210 to 149 microns). This procedure also rounds off the corners of the particles, producing a desirable spherical shape. In the jet grinder the particles are whirled by a stream of gas within an aluminum oxide cylinder. Fines are exhausted through a 200-mesh stainless steel screen.

(6) The plutonium dioxide particles are then blended with −325-mesh stainless steel powder and cold pressed at 60 tons per square inch to form pellets 0.678 inch diameter by 1.000 inch long. The pressed pellets are then loaded into an extrusion billet as shown in FIG. 4 of the drawing. As shown in FIG. 4, a plurality of pellets 10 are loaded into a stainless steel can 11 which is closed at one end by a solid bottom 12. A $\frac{1}{16}$-inch-thick porous stainless steel sintered disk 13 is then inserted into can 11 on top of the top pellet 10. An additional ½-inch-thick non-fueled stainless steel powder pellet 14 is inserted on top of disk 13 and a second disk 13 inserted on top of this. Finally cap 15 which includes an integral outgas tube 16 is inserted and seal welded to the can. The completed assembly is then preheated and outgassed. The purpose of the outgassing is to assure complete removal of any undesirable gaseous materials that could become trapped within the pellets. After 30 minutes at 1150° C. the outgassing tube is sealed off and the extrusion billet thus prepared is placed in a heated container for extrusion through a die. To produce the specified fuel element and fueled core size for the Fast Flux Test Facility, a 6/1 reduction ratio is required. The extruded elements are then finished by cutting to the appropriate length and employing centerless grinding or cathodic etching to the required finished diameter. Although the preferred method has been described, obviously various means for assembly of the extrusion billet and for extrusion of cermet fuel pins may be employed.

The principal advantage of the process as described is its versatility with respect to the fuel particle characteristics of density, size distribution and hardness which greatly affect the in-reactor performance of fuel elements. While a particular application of this process has been stressed, it will be apparent that it is possible to employ the process to fabricate cermet fuel pins in which the fuel particle density is controllable over a wide range.

One important feature of the present invention is use of stoichiometric plutonium dioxide. Stoichiometric plutonium dioxide is more resistant to deformation temperature than is hypostoichiometric plutoninum dioxide, $PuO_{2-x}$. The relative plasticity during extrusion of particles with three different oxygen-to-plutonium ratios is shown in FIGS. 2 to 4. It will be apparent that the least deformation is apparent in FIG. 4 wherein stoichiometric plutonium dioxide was employed, somewhat more deformation is apparent in FIG. 3 wherein $PuO_{2-x}$ was employed, and the most in FIG. 2 wherein $Pu_2O_3$ was employed. Since it is desirable at the present state of development of fuels for fast reactors to have, in cermet fuel pins, fuel particles with high volume-to-surface ratios and high resistance to changes in density and/or shape, within a high-density metallic matrix, the advantages of the use of stoichiometric oxides are obvious.

Figure 6:
FIG. 6 is a similar tracing wherein the particles have had their corners rounded off.

Particle shape is also important. Extruded cermets containing angular particles and spherical or rounded particles were made. The tendency for particle fracture and stringering was almost completely eliminated when rounded or spherical fuel particles were used as is shown in FIGS. 5 and 6.

Extruded cermets containing low-density (80–85% of theoretical density) ceramic particles in a high-density matrix have been made. Some densification occurs during extrusion so that it is necessary to start with cermets containing ceramic particles having a density of about 75% of theoretical to arrive at this result. Cermets thus prepared appear to satisfy in every respect the objects of the present invention.

It will be understood that the invention is not to be limited to the details given herein but that it may be modified within the scope of the appended claims.

The embodiments of the invention in which an exclusive property or privilege is claimed are defined as follows:

1. A method of preparing a cermet nuclear fuel comprising preparing rounded particles of an oxide selected from the group consisting of plutonium dioxide, uranium dioxide and mixtures thereof, said oxide being of relatively low density and of essentially stoichiometric composition, mixing said particles with a metal powder, cold-pressing the mixture thus formed into pellets, and compressing the pelleted fuel to the desired density.

2. A method according to claim 1 wherein the oxide is plutonium dioxide and the metal is stainless steel.

3. A method according to claim 2 wherein said rounded particles are prepared by burning plutonium strip in a water-saturated atmosphere at a temperature of 450 to 500° C., calcining the resulting plutonium dioxide powder at 1000° C. for at least one hour, consolidating the powder by pneumatic impaction, and crushing and screening the plutonium dioxide to produce particles having a size distribution of less than 35 mesh and greater than 80 mesh and a density of 65 to 75 percent of theoretical.

4. A method according to claim 1 wherein the pelleted fuel is compressed to the desired density by loading the fuel pellets into a heavy walled can formed of cladding material and coextruding the can and contents.

5. A method of preparing a cermet nuclear fuel containing a ceramic phase of desired density comprising preparing rounded particles of an oxide selected from the group consisting of plutonium dioxide, uranium dioxide, and mixtures thereof of essentially stoichiometric composition and of a density slightly less than the desired final density, mixing said particles with stainless steel powder, cold pressing the mixture thus formed into pellets, loading the pellets into a heavy walled, stainless steel can, and coextruding the can and contents.

References Cited
UNITED STATES PATENTS

| | | | |
|---|---|---|---|
| 3,171,714 | 3/1965 | Jones et al. | 264—.5 |
| 3,276,867 | 4/1966 | Brite et al. | 75—206 |
| 3,318,695 | 5/1967 | Goslee et al. | 75—206 |

CARL D. QUARFORTH, *Primary Examiner.*

R. L. GRUDZIECKI, *Assistant Examiner.*